United States Patent
Hu et al.

(10) Patent No.: US 11,933,656 B2
(45) Date of Patent: Mar. 19, 2024

(54) MAGNETOSTRICTIVE LIQUID LEVEL METER USING MULTIPLE WAVEGUIDE WIRES AND LIQUID LEVEL MEASUREMENT METHOD THEREOF

(71) Applicant: BEIJING CONNETECH ELECTRONICS TECHNOLOGY CO., LTD., Beijing (CN)

(72) Inventors: Xiushan Hu, Beijing (CN); Yang Xia, Beijing (CN); Zhongying Yang, Beijing (CN)

(73) Assignee: BEIJING CONNETECH ELECTRONICS TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 17/423,107

(22) PCT Filed: May 28, 2019

(86) PCT No.: PCT/CN2019/088699
§ 371 (c)(1),
(2) Date: Jul. 14, 2021

(87) PCT Pub. No.: WO2020/147240
PCT Pub. Date: Jul. 23, 2020

(65) Prior Publication Data
US 2022/0128393 A1      Apr. 28, 2022

(30) Foreign Application Priority Data

Jan. 17, 2019 (CN) .......................... 201910043245.5

(51) Int. Cl.
*G01F 23/62* (2006.01)
*G01F 23/80* (2022.01)

(52) U.S. Cl.
CPC ............ *G01F 23/62* (2013.01); *G01F 23/802* (2022.01)

(58) Field of Classification Search
CPC ...... G01B 7/26; G01N 29/2412; G01F 23/72; G01F 23/74; G01F 23/68; G01F 23/62; G01F 23/802; G01F 23/2963
See application file for complete search history.

(56) References Cited

U.S. PATENT DOCUMENTS

| | | | |
|---|---|---|---|
| 4,071,818 A | * | 1/1978 | Krisst ..................... G01R 33/18 324/207.13 |
| 4,158,964 A | * | 6/1979 | McCrea .............. G01F 23/2963 73/290 V |

(Continued)

FOREIGN PATENT DOCUMENTS

| CN | 201444070 U | 4/2010 |
|---|---|---|
| CN | 204854609 U | 12/2015 |

(Continued)

OTHER PUBLICATIONS

International Search Report of PCT/CN2019/088699.
Written Opinion of PCT/CN2019/088699.

*Primary Examiner* — Tran M. Tran

(57) ABSTRACT

The present application provides a magnetostrictive liquid level meter and a liquid level measurement method thereof and belongs to the technical field of a liquid level meter. The meter comprises a holder; several measurement units configured to be fixed sequentially to the holder along a lengthwise direction of the holder; several waveguide wires configured to be connected with the several measurement units in a one-to-one correspondence mode, wherein each waveguide wire is arranged along the lengthwise direction of the holder, and a tail end of a upper waveguide wire is at least extended to a head end of a lower waveguide wire; and the magnetic float configured to be sheathed outside the holder, (Continued)

wherein the magnetic float moves up and down along the holder when a liquid level is changed, and one or more waveguide wires are located in a magnetic field formed by the magnetic float.

15 Claims, 4 Drawing Sheets

(56) References Cited

U.S. PATENT DOCUMENTS

| | | | | |
|---|---|---|---|---|
| 5,196,791 A * | 3/1993 | Dumais | ............... | G01D 5/247 |
| | | | | 324/207.13 |
| 5,253,521 A * | 10/1993 | Abramovich | ......... | G01F 23/72 |
| | | | | 374/E1.004 |
| 5,253,522 A * | 10/1993 | Nyce | ............... | G01F 23/0038 |
| | | | | 324/207.13 |
| 5,258,707 A * | 11/1993 | Begin | ............... | G01F 23/2963 |
| | | | | 324/207.13 |
| 5,313,160 A * | 5/1994 | Gloden | ............... | G01B 17/00 |
| | | | | 324/207.13 |
| 5,412,316 A * | 5/1995 | Dumais | ............ | G01F 23/2963 |
| | | | | 324/207.13 |
| 5,471,873 A * | 12/1995 | Nyce | ............... | G01F 23/0038 |
| | | | | 73/32 A |
| 5,473,245 A * | 12/1995 | Silvus, Jr. | ............ | G01F 23/02 |
| | | | | 324/207.13 |
| 5,478,966 A | 12/1995 | Sugi | | |
| 5,680,041 A * | 10/1997 | Begin | ............... | G01F 23/72 |
| | | | | 324/207.13 |
| 5,717,330 A * | 2/1998 | Moreau | ............ | G01B 7/003 |
| | | | | 324/207.13 |
| 5,804,961 A * | 9/1998 | Castillo | ............ | G01B 7/003 |
| | | | | 324/207.13 |
| 5,929,763 A * | 7/1999 | Koski | ............ | G01F 23/2963 |
| | | | | 324/207.21 |
| 5,998,991 A * | 12/1999 | Begin | ............... | G01F 23/72 |
| | | | | 324/207.13 |
| 5,998,992 A * | 12/1999 | Arai | ............... | G01D 5/485 |
| | | | | 324/207.13 |
| 6,097,183 A * | 8/2000 | Goetz | ............... | G01D 5/145 |
| | | | | 324/207.21 |
| 6,289,731 B1 * | 9/2001 | Lo | ............... | G01F 23/72 |
| | | | | 73/314 |
| 6,513,378 B1 * | 2/2003 | Love, Jr. | ............... | G01F 23/74 |
| | | | | 340/623 |
| 6,559,636 B1 * | 5/2003 | Brunsch | ............... | G01P 3/486 |
| | | | | 324/207.13 |
| 6,612,168 B2 * | 9/2003 | Barr | ............... | G01F 23/2968 |
| | | | | 324/207.13 |
| 6,910,378 B2 * | 6/2005 | Arndt | ............... | G01F 23/2966 |
| | | | | 73/290 R |
| 7,932,714 B2 * | 4/2011 | Fauveau | ............... | G01D 21/00 |
| | | | | 324/126 |
| 9,170,144 B2 * | 10/2015 | Qi | ............... | G01N 27/123 |
| 9,389,061 B2 * | 7/2016 | Nyce | ............... | G01B 7/14 |
| 9,581,485 B2 * | 2/2017 | Haynes | ............... | G01F 23/2963 |
| 9,677,927 B2 * | 6/2017 | Wu | ............... | G01B 7/30 |
| 9,702,243 B2 * | 7/2017 | Wang | ............... | G01K 11/22 |
| 10,444,055 B2 * | 10/2019 | Krolak | ............... | G01S 13/88 |
| 10,634,546 B2 * | 4/2020 | Zhang | ............... | G01F 23/74 |
| 10,663,327 B2 * | 5/2020 | Beutler | ............... | G01B 7/30 |
| 10,801,875 B2 * | 10/2020 | Ku | ............... | G01F 23/74 |
| 11,313,713 B2 * | 4/2022 | Sultan | ............... | G01F 23/40 |
| 2009/0265132 A1 * | 10/2009 | Schrittenlacher | ........ | G01N 9/20 |
| | | | | 73/314 |
| 2013/0233079 A1 * | 9/2013 | Swartz | ............... | G01M 5/0033 |
| | | | | 73/579 |
| 2017/0074714 A1 * | 3/2017 | Aschenbrenner | ....... | G01F 25/20 |

FOREIGN PATENT DOCUMENTS

| | | | |
|---|---|---|---|
| CN | 105973135 A | * | 9/2016 |
| CN | 106662480 A | | 5/2017 |
| CN | 107421606 A | | 12/2017 |
| CN | 109540266 A | | 3/2019 |
| CN | 209296106 U | | 8/2019 |
| CN | 113267237 A | * | 8/2021 |

* cited by examiner

MAGNETOSTRICTIVE LIQUID LEVEL METER USING MULTIPLE WAVEGUIDE WIRES AND LIQUID LEVEL MEASUREMENT METHOD THEREOF

CROSS-REFERENCE TO RELATED APPLICATIONS

This Application is a national stage application of PCT/CN2019/088699. This application claims priorities from PCT Application No. PCT/CN2019/088699, filed May 28, 2019, and from the Chinese patent application 201910043245.5 filed Jan. 17, 2019, the content of which are incorporated herein in the entirety by reference.

FIELD OF THE INVENTION

The present application relates to a magnetostrictive liquid level meter and a liquid level measurement method thereof, and belongs to the technical field of a liquid level meter.

BACKGROUND OF THE INVENTION

Magnetostrictive liquid level meters are widely used to measure a liquid level of liquid.

When a magnetostrictive liquid level meter works, the activation pulse current is provided to waveguide wires, and the current is transmitted along the waveguide wires and will generate pulsed magnetic field around the waveguide wires. A rod of the magnetostrictive liquid level meter is provided with a magnetic float which can move upwards or downwards along the rod with the change of liquid level. When the pulsed magnetic field interacts with a magnetic field formed by the magnetic float, the magnetic field around the magnetic float will be changed, thereby the waveguide wires made of magnetostrictive material will generate a torsional wave pulse signal at the position of the magnetic float. The torsional wave pulse signal is a kind of mechanical vibration wave, and is transmitted towards two ends of the waveguide wires at a fixed speed. The measurement unit connected to the head end of the waveguide wires receives the torsional wave pulse signal, calculates the time difference between the emitted time of the activation pulse and the detected time of the torsional wave pulse signal, and further determines the position of the magnetic float which is the position of liquid level.

In some practices, when the measurement range increases, the signal will attenuate with an increase in the length of the waveguide wires, because the torsional wave pulse transmitted along the waveguide wires is a kind of mechanical vibration wave. For the measurement of large range such as the range of more than 30 m, the torsional wave pulse will be attenuated with the increase in length of the waveguide wires, and the detected signals will become very weak. Although the weak signals are amplified, the signals may be submerged by noise and cannot be measured reliably. Furthermore, a speed error will be generated when the torsional wave pulse is transmitted along the waveguide wires. A measurement error of the magnetostrictive liquid level meter is primarily caused by the speed error when the torsional wave pulse is transmitted along the waveguide wires. The measurement error will be increased with the increase of the measurement range.

In conclusion, the increase of the measurement range of the magnetostrictive liquid level meters will result in the increase of the measurement error, and thus the measurement range of the magnetostrictive liquid level meters will be limited in some practical applications.

SUMMARY

In order to solve the technical problems as mentioned above, the present application provides a magnetostrictive liquid level meter and a liquid level measurement method thereof, to increase the measurement range and guarantee the measurement accuracy.

It is an objective of the present application to provide the following technical solutions.

According to a first aspect, the present application provides a magnetostrictive liquid level meter, comprising: a holder; several measurement units configured to be fixed sequentially to the holder along a lengthwise direction of the holder; several waveguide wires configured to be connected with the several measurement units in a one-to-one correspondence mode, wherein each waveguide wire is arranged along the lengthwise direction of the holder, and a tail end of a upper waveguide wire is at least extended to a head end of a lower waveguide wire; and the magnetic float configured to be sheathed outside the holder, wherein the magnetic float moves up and down along the holder when a liquid level is changed, and one or more waveguide wires are located in a magnetic field formed by the magnetic float.

Preferably, the tail end of the upper waveguide wire is extended to exceed the head end of the lower waveguide wire, but not exceed a tail end of the lower waveguide wire, and an overlapping measurement region is formed between two adjacent measurement units.

Preferably, the several measurement units are distributed at an equal interval, and/or measurement lengths of the waveguide wires are equal.

Preferably, the magnetostrictive liquid level meter further comprises several dampers, the several dampers are connected to the several waveguide wires in a one-to-one correspondence mode, and the dampers weakens and absorbs the torsional wave pulse that is transmitted towards the tail end of the waveguide wires.

Preferably, the magnetostrictive liquid level meter further comprises a control unit, the control unit is connected with the several measurement units respectively, and is used to receive the data from the measurement units measuring the magnetic float and obtain the liquid level based on the received data.

Preferably, the measurement units comprises a first processor, a first excitation pulse circuit module, a first sensor, a first amplifying module and the first communication module, wherein the first processor is connected with the first excitation pulse circuit module. The first excitation pulse circuit module is connected with the waveguide wires, the first processor is connected with the first amplifying module, the first amplifying module is connected with the first sensor, the first sensor is arranged to the head end of the waveguide wires to detect the torsional wave pulse signals transmitted to the head end of the waveguide wires, the first processor is connected with the first communication module.

Preferably, the control unit comprises a second processor and a second communication module, wherein the second processor is connected with the second communication module, and the second communication module is connected with the first communication module to realize the connection of the control unit and the measurement units.

Preferably, the first sensor is an induction coil or a piezoelectric ceramics.

Preferably, the measurement units comprises a second excitation pulse circuit module, a second amplifying module and a second sensor, wherein the second excitation pulse circuit module is connected with the waveguide wires, the second amplifying module is connected with the second sensor, and the second sensor is arranged to the head end of the waveguide wires and used to detect the torsional wave pulse signals transmitted to the head end of the waveguide wires.

Preferably, the control unit comprises a third processor, transmit gating switches and receive gating switches, the third processor is connected with the transmit gating switches and the receive gating switches respectively, the transmit gating switches are connected with the second excitation pulse circuit modules of each measurement unit respectively, and the receive gating switches are connected with the second amplifying modules of each measurement unit respectively.

Preferably, the second sensor is an induction coil or a piezoelectric ceramics.

According to a second aspect, the present application provides a liquid level measurement method using the magnetostrictive liquid level meter as mentioned above, comprising: determining one or more measurement units by which the magnetic float is measured; and calculating the liquid level is calculated based on the determined measurement units.

Preferably, calculating the liquid level comprises a distance calculation and a liquid level determination, in the distance calculation, a distance between the magnetic float and a predetermined measurement reference point is calculated by a predetermined equation, based on the determined measurement units; and in the liquid level determination, the liquid level is obtained based on the calculated distance.

Preferably, the predetermined calculation equation is $$D = \left(L_n + \sum_{i=1}^{n} d_{i-1}\right) * Q_n + \left(L_{n-1} + \sum_{j=1}^{n-1} d_{j-1}\right) * Q_{n-1}$$

where $Q_n + Q_{n-1} = 100\%$, D is the distance between the predetermined measurement reference point and the magnetic float, $L_n$ is a distance between a n measurement unit by which the magnetic float is measured and the magnetic float, $L_{n-1}$ is a distance between a n−1 measurement unit by which the magnetic float is measured and the magnetic float, i, j and n are integers, and $1 \leq i \leq n$, $1 \leq j \leq n-1$, when i=1, $d_0$ is a distance between a first measurement unit and the predetermined measurement reference point, and when i≥1, $d_{i-1}$ is a distance between a i−1 measurement unit and a i measurement unit, when j=1 $d_0$ is the distance between the first measurement unit and the predetermined measurement reference point, and when j≥1, $d_{j-1}$ is a distance between a j−1 measurement unit and a j measurement unit, both $Q_n$ and $Q_{n-1}$ are weights.

Preferably, if the determined measurement unit is only the n measurement unit, then $Q_n = 100\%$ and $Q_{n-1} = 0$, the predetermined calculation equation is simplified as $D = L_n + \sum_{i=1}^{n} d_{i-1}$.

Preferably, if the determined measurement units are the n measurement unit and the n−1 measurement unit, the method further comprises:

Calculating values of $Q_n$ and $Q_{n-1}$, based on a position of the magnetic float in the overlapping measurement region.

Preferably, based on the overlapping measurement region, the value of $Q_n$ is calculated using a predetermined first linear equation, the value of $Q_{n-1}$ is calculated using a predetermined second linear equation, and $Q_n + Q_{n-1} = 100\%$, wherein a slope of the predetermined first linear equation is a positive value and a slope of the predetermined second linear equation is a negative value.

The present application has the following beneficial effects.

In the embodiments of the present application, the total measurement range of the magnetostrictive liquid level meter is divided the several small measurement ranges, and thus each measurement unit only performs the measurement of one small measurement range. When the magnetic float is measured by the measurement units, the distance between the magnetic float and the measurement unit by which the magnetic float is measured can be determined. Since the relative positions among the measurement units are fixed, the liquid level that the magnetic float is located can be determined. According to the embodiments of the present application, the measurement range can be increased and the measurement accuracy can be raised.

It is to be understood that both the foregoing general description and the following detailed description are exemplary and explanatory and are not restrictive of the invention, as claimed.

BRIEF DESCRIPTION OF THE DRAWINGS

In order to more clearly illustrate the technical solutions in the embodiments of the present application or in the prior art, drawings necessary for describing the embodiments will be briefly introduced below, obviously, for those of ordinary skill in the art, the following described drawings are only parts of embodiments of the present application. For ordinary technical staff in the art, under the premise of without contributing creative labor, other accompanying drawings further can be obtained according to these accompanying drawings.

DETAILED DESCRIPTION OF EXEMPLARY EMBODIMENT

In certain embodiments, to make the objective, technical solution and advantages of the present application much clearer, the present application will be described in further detail with reference to the accompanying drawings and embodiments. Apparently, the described embodiments are merely some but not all of the embodiments of this application. All other embodiments obtained by persons skilled in the art based on the embodiments of this application without creative efforts shall fall within the protection scope of this application.

Figure 1:
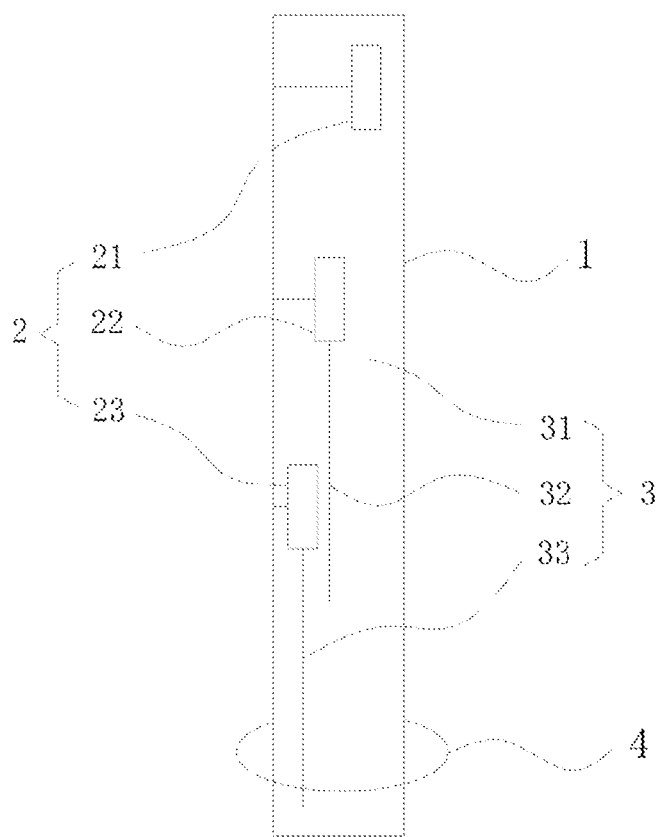
FIG. 1 is a schematic diagram of a magnetostrictive liquid level meter according to one embodiment of the present application.

FIG. 1 is a schematic diagram of a magnetostrictive liquid level meter according to one embodiment of the present application. As shown in FIG. 1, the magnetostrictive liquid level meter may include a holder 1, several measurement units 2, several waveguide wires 3, and a magnetic float 4.

The several measurement units 2 may be fixed sequentially to the holder 1 along a lengthwise direction of the holder 1.

The several waveguide wires 3 may be connected with the several measurement units 2 in a one-to-one correspondence mode.

Each waveguide wire 3 may be arranged along the lengthwise direction of the holder 1, and a tail end of an upper waveguide wire 3 is at least extended to a head end of a lower waveguide wire 3.

The magnetic float 4 may be sheathed outside the holder 1. The magnetic float 4 can float up and down along the holder 1 when the liquid level is changed. At this time, one or more waveguide wires 3 are located in a magnetic field formed by the magnetic float 4.

Some embodiments will be described in detail with reference to some specific applications.

In one application, the magnetostrictive liquid level meter may be used to measure a liquid level. The magnetostrictive liquid level meter is vertically placed, and is inserted into liquid. The magnetic float 4 will float on liquid. Since the magnetic float 4 is sheathed outside the holder 1, the magnetic float 4 can be moved up and down along the holder 1 when the liquid level is changed. The description regarding a relative position relationship of the upper waveguide wire 3 and the lower waveguide wire 3 is based on the vertical placement of the magnetostrictive liquid level meter.

In some practical applications, the holder 1 may be of a structure of a hollow elongate rod, and the several measurement units 2 and the corresponding waveguide wires 3 may be placed inside of the structure of the hollow elongate rod. The measurement units 2 can be isolated from water by sealing the structure of the hollow elongate rod of the holder 1.

The magnetic float 4 can float on a surface of water, and be made of a floater and a permanently magnetic ring. The floater has a through hole. The holder 1 may pass through the through hole. The permanently magnetic ring may be arrange inside of the floater, and may be arranged to surround the through hole.

In the present application, each measurement unit 2 and the corresponding waveguide wire 3 are used to measure the magnetic float 4 based on the following way. The measurement units 2 can apply excitation pulse signals to the waveguide wires 3 connected to the measurement units 2. The excitation pulse signals are transmitted along the waveguide wires 3 and form a pulse magnetic field around the waveguide wires 3. When the excitation pulse signals are transmitted to the position of the magnetic float 4, the formed pulse magnetic field will interact with the magnetic field formed by the magnetic float 4. Based on the interaction, the waveguide wires 3 will occur the magnetistriction effect. At the position of the magnetic float 4, torsional wave pulse signals will be generated in the waveguide wires 3.

The torsional wave pulse signals are transmitted into the measurement units 2 along the waveguide wires 3. The time that the torsional wave pulse signals detected by the measurement units 2 shows that the magnetic float 4 is detected. The distance between the measurement units 2 and the magnetic float 4 can be determined based on the time difference between an emitted time of the excitation pulse signals and a detected time of the torsional wave pulse signals.

In the present application, the total measurement range of the magnetostrictive liquid level meter is divided into several small measurement ranges. Each measurement unit 2 only performs the measurement of a small measurement range thereof. In order to assure the continuous measurement of the magnetic float and avoid the loss of some measured positions, the measurement units 2 are arranged to be of capability of measuring the magnetic float 4 in the total measurement range. For this purpose, when each waveguide wire 3 is arranged along the lengthwise direction of the holder 1, the tail end of the upper waveguide wire 3 is arranged to extend at least to the head end of the lower waveguide wire 3. By this way, the measurement units 2 can measure the magnetic float 4 in the total measurement range when the liquid level measurement is performed. In one example, the tail end of the upper waveguide wire 3 is extended exactly the head end of the lower waveguide wire 3, and the surface of the tail end of the upper waveguide wire 3 and the surface of the head end of the lower waveguide wire 3 is arranged to be offset from each other and be in the same plane.

In the embodiments as mentioned above, the total measurement range of the magnetostrictive liquid level meter is divided the several small measurement ranges, and thus each measurement unit 2 only performs the measurement of one small measurement range. By this way, the measurement of one small measurement range can increase accuracy of measurement. In addition, the magnetic float 4 is always measured by the measurement units 2 when the liquid level measurement is performed, because the tail end of the upper waveguide wire 3 is extended at least to the head end of the lower waveguide wire 3. When the magnetic float 4 is measured by the measurement units 2, the distance between the magnetic float 4 and the measurement unit 2 by which the magnetic float 4 is measured can be determined. Since the relative positions of any two adjacent measurement units 2 are fixed, the liquid level that the magnetic float 4 is located can be determined. According to the embodiments of the present application, the measurement range can be increased and the measurement accuracy can be raised. In the practical applications, the total measurement range of the magnetostrictive liquid level meter can be increased indefinitely, and the measurement accuracy can also be assured.

In one example, as shown in FIG. 1, the tail end of the upper waveguide wire 3 can be extended to exceed the head end of the lower waveguide wire 3, but not exceed the tail end of the lower waveguide wire 3, so that the two adjacent measurement units can be of the overlapping measurement region.

The embodiments of the present application, the magnetic float 4 can be always measured by the measurement units 2 when the liquid level measurement is performed, and the practical application will become easy. As mentioned above, in one example, the tail end of the upper waveguide wire 3 is extended exactly to the head end of the lower waveguide wire 3, and the surface of the tail end of the upper waveguide wire 3 and the surface of the head end of the lower waveguide wire 3 is arranged to be offset from each other and be in the same plane. In this example, the difficulty for implementation is high if the surface of the tail end and the surface of the head end is arranged to be in the same place. In the example that the tail end of the upper waveguide wire 3 exceeds the head end of the lower waveguide wire 3 but does not exceed the tail end of the lower waveguide wire 3, the measurement length of each waveguide wire can be limited and is not too long to make the tail end of the upper waveguide wire 3 exceeds the tail end of the lower waveguide wire 3.

Based on the embodiments of the present application, the practical application will become easy and the measurement accuracy is increased.

Some embodiments will be described in more detail with reference to some specific applications.

When a change in liquid level occurs, the magnetic float 4 will move upward or downward along the holder 1. The tail end of the upper waveguide wire 3 is arranged to exceed the head end of the lower waveguide wire 3 but not exceed the tail end of the lower waveguide wire 3, and the position relationship between the magnetic float 4 that moves along the holder 1 and the waveguide wire(s) 3 that locates at the liquid level may be that: one waveguide wire 3 is located in the magnetic field formed by the magnetic float 4, or two waveguide wires 3 are located in the magnetic field formed by the magnetic float 4.

The several measurement units 2 are fixed to the holder 1 sequentially. In the practical applications, the magnetostrictive liquid level meter is arranged to be vertical when used, and the sequence of the measurement units can be determined from top to bottom. Taking an example shown in FIG. 1 to explain, the magnetostrictive liquid level meter may include three measurement units. The three measurement units are a first measurement unit 21, a second measurement unit 22 and a third measurement unit 23 from top to bottom. The first measurement unit 21 is connected with a first waveguide wire 31, the second measurement unit 22 is connected with a second waveguide wire 32, and the third measurement unit 23 is connected with a third waveguide wire 33. After the three measurement units are fixed to the holder 1, the distance between two adjacent measurement units is fixed. When determining the liquid level, the liquid level that the magnetic float 4 is located can be determined, based on the distance between the magnetic float 4 and the measurement unit by which the magnetic float 4 is measured, and based on the fixed positions of the measurement units.

When only one waveguide wire is located in the magnetic field formed by the magnetic float 4, for example, only the third waveguide wire 33 connected with the third measurement unit 23 is located in the magnetic field formed by the magnetic float 4, the third measurement unit 23 can measure the magnetic float 4. The third measurement unit 23 can determine the distance between magnetic float 4 and the third measurement unit 23, based on the time difference between the emitted activation pulse signal and the detected torsional wave pulse signal. Since the positions of the measurement units are fixed and the distances among the measurement units are fixed, one measurement reference point can be predetermined, and the liquid level can be determined based on the predetermined measurement reference point. For example, if the first measurement unit 21 is set as the measurement reference point, the distance between the predetermined measurement reference point and the magnetic float can be obtained, based on the distance between the first measurement unit 21 and the second measurement unit 22, the distance between the second measurement unit 22 and the third measurement unit 23, and the distance between the third measurement unit 23 and the magnetic float 4. The distance between the predetermined measurement reference point and the magnetic float is the value of the liquid level.

When two waveguide wires are located in the magnetic field formed by the magnetic float 4, for example the third waveguide wire 33 and the second waveguide wire 32 are located in the magnetic field formed by the magnetic float 4, the magnetic float 4 is located in an overlapping measurement region of the second measurement unit 22 and the third measurement unit 23. The overlapping measurement region can guarantee that the magnetostrictive liquid level meter measure the magnetic float 4 continuously in the total measurement range. Therefore, the discontinuous region in which the magnetic float 4 cannot be measured will be eliminated. When two waveguide wires are located in the magnetic field formed by the magnetic float 4, the determination of the liquid level can be as follows. When the liquid level is raised and two waveguide wires are located in the magnetic field, the magnetic float 4 can be measured to determine the liquid level only by the upper measurement unit. Alternatively, when the liquid level becomes lower and two waveguide wires are located in the magnetic field formed by the magnetic float 4, the magnetic float 4 can be measured to determine the liquid level only by the lower measurement unit.

Furthermore, the several measurement units 2 are distributed at an equal interval. The distances between the two adjacent measurement units 2 can be equal, and thus the computation and determination of the liquid level will become easy.

Furthermore, the measurement lengths of each waveguide wire 3 are equal. The measurement range of each measurement unit 2 can be equal, and thus the computation and determination of the liquid level will also become easy.

Furthermore, the several measurement units 2 are distributed at an equal interval and the measurement lengths formed by each waveguide wire 3 are equal. The measurement ranges of each measurement unit 2 are equal and the distances of the two adjacent measurement units are equal, and thus the computation and determination of the liquid level will become easy.

Figure 2:
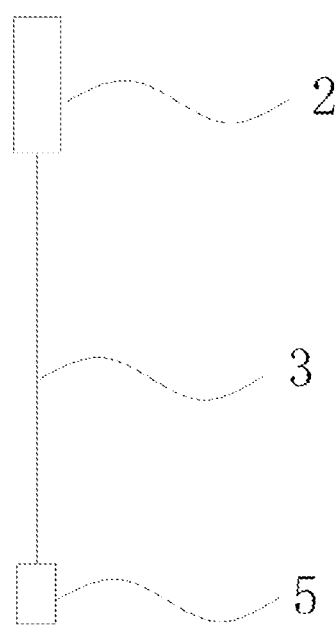
FIG. 2 is a schematic diagram in which a damper is arranged at the tail end of the waveguide wires according to one embodiment of the present application.

FIG. 2 is a schematic diagram in which a damper is arranged at the tail end of the waveguide wires according to one embodiment of the present application. As shown in FIG. 2, in one example, the magnetostrictive liquid level meter also includes several dampers. The several dampers 5 are connected to the several waveguide wires 3 in a one-to-one correspondence mode. The dampers 5 can weaken and absorb the torsional wave pulse that is transmitted towards the tail end of the waveguide wires 3.

In some applications, the waveguide wires 3 located at the position of the magnetic float 4 generate a pulsed magnetic field, and the pulsed magnetic field will interact with the magnetic field generated by the magnetic float 4. Based on the interaction, the waveguide wires 3 will occur the magnetistriction effect. At the position of the magnetic float 4, the waveguide wires 3 will generate torsional wave pulse signals. The torsional wave pulse signals are transmitted towards two ends of the waveguide wires 3. The torsional wave pulse signals transmitted towards the head end of the waveguide wire 3 are detected by the measurement unit 2, and The torsional wave pulse signals transmitted towards the tail end of the waveguide wire 3 are redundant. In order to avoid the negative impact, it is needed to weaken or absorb the torsional wave pulse signals transmitted towards the tail end of the waveguide wire 3. In the example, the dampers 5 are arranged to the tail ends of the waveguide wires 3. The damper can weaken and absorb the torsional wave pulse signals transmitted to the tail ends of the waveguide wires 3.

In the embodiments as mentioned above, the computation and determination of the liquid level can be executed by a control unit. The control unit may not be included in the embodiments of the present application, and can be purchased via other channels and then be used. Alternatively, the embodiments of the present application may include the control unit to be used for the user. In these embodiments, the magnetostrictive liquid level meter also includes a control unit 6. The control unit 6 is connected with the several measurement units 2 respectively, and is used to receive the data from the measurement units 2 measuring the magnetic float 4 and obtain the liquid level based on the received data.

Figure 3:
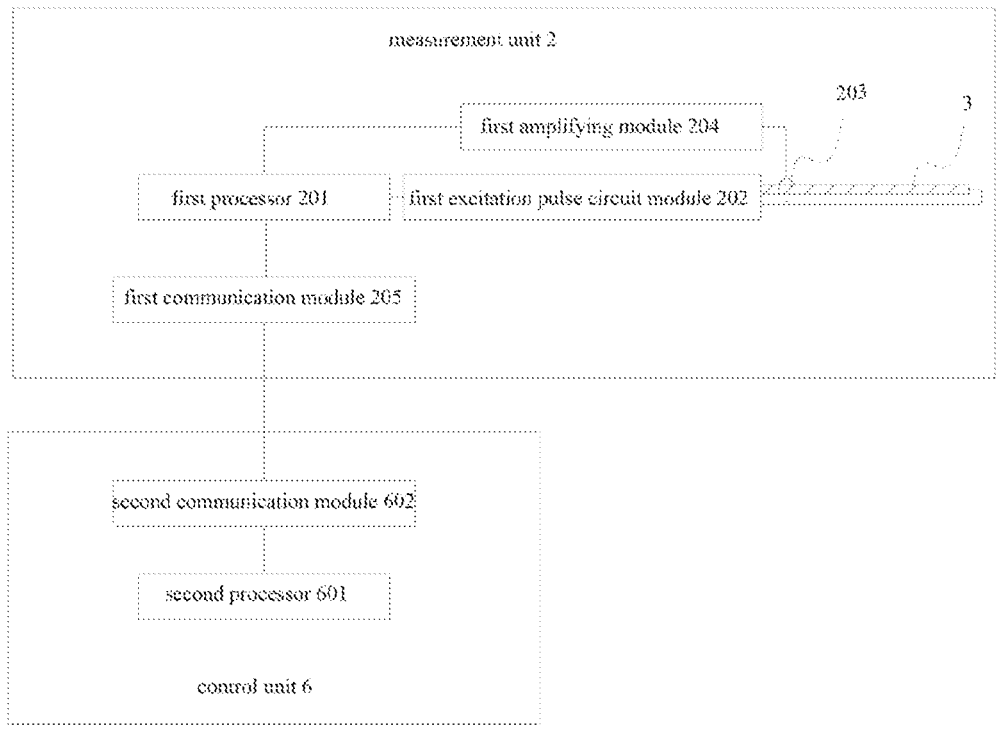
FIG. 3 is a schematic diagram of the magnetostrictive liquid level meter and the control unit of the magnetostrictive liquid level meter according to one embodiment of the present application.

FIG. 3 is a schematic diagram of the magnetostrictive liquid level meter and the control unit of the magnetostrictive liquid level meter according to one embodiment of the present application. As shown in FIG. 3, in one embodiment, the measurement units 2 may include a first processor 201, a first excitation pulse circuit module 202, a first sensor 203, a first amplifying module 204 and the first communication module 205.

The first processor 201 may be connected with the first excitation pulse circuit module 202. The first excitation pulse circuit module 202 may be connected with the waveguide wires 3.

The first processor 201 may be connected with the first amplifying module 204. The first amplifying module 204 may be connected with the first sensor 203. The first sensor 203 may be arranged to the head end of the waveguide wires 3, to detect the torsional wave pulse signals transmitted to the head end of the waveguide wires 3.

The first processor 201 may be connected with the first communication module 205.

As to the connection of the first excitation pulse circuit module 202 and the waveguide wires 3, a positive polarity of the first excitation pulse circuit module 202 may be connected with the head end of the waveguide wires 3, and the tail end of the waveguide wires 3 may be connected with a negative polarity through a loop wire to form a closed loop.

As shown in FIG. 3, the control unit 6 may include a second processor 601 and a second communication module 602.

The second processor 601 may be connected with the second communication module 602.

The second communication module 602 may be connected with the first communication module 205, to realize the connection of the control unit 6 and the measurement units 2.

Some embodiments will be described in more detail with reference to some specific applications.

In one specific application, the first processor 201 is used to control the first excitation pulse circuit module 202 to generate excitation pulse signals. The excitation pulse signals are applied to the head end of the waveguide wires 3, and are transmitted along the waveguide wires 3 and generate a pulsed magnetic field around the waveguide wires 3.

The pulsed magnetic field generated by the waveguide wires 3 located at the position of the magnetic float 4 and the magnetic field generated by the magnetic float 4 interact, and thus the waveguide wires 3 will occur the magnetistriction effect. At the position of the magnetic float 4, the waveguide wires 3 will generate torsional wave pulse signals. The torsional wave pulse signals are transmitted towards two ends of the waveguide wires 3. The torsional wave pulse signals transmitted towards the head end of the waveguide wires 3 are detected by the first sensor 203. The first amplifying module 204 receives and amplifies the torsional wave pulse signals. The first amplifying module 204 sends the amplified signals to the first processor 201. The first processor 201 uses a built-in AD sample module to sample the amplified signals. The first processor 201 is used to determine the distance between the measurement unit 2 and the magnetic float 4 by calculating the time difference between the emitted time of the activation pulse signal and the detected time of the torsional wave pulse. Then, the measurement unit 2 corresponding to the detection of the magnetic float 4 provides the determined distance to the control unit 6, and the control unit 6 can determined the measurement unit 2 corresponding to the detection of the magnetic float 4. By this way, the control unit 6 can determine the liquid level in that the magnetic float 4 is located, based on the distance between the measurement unit 2 corresponding to the detection of the magnetic float 4 and the magnetic float 4, and based on the fixed positions of the several measurement units 2.

Figure 4:
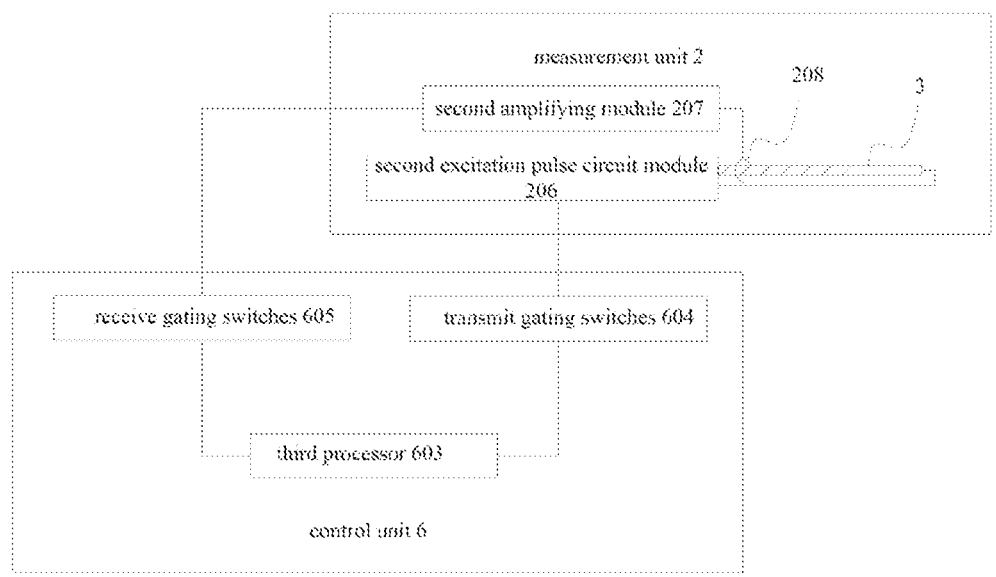
FIG. 4 is a schematic diagram of the magnetostrictive liquid level meter and the control unit of the magnetostrictive liquid level meter according to another embodiment of the present application.

FIG. 4 is a schematic diagram of the magnetostrictive liquid level meter and the control unit of the magnetostrictive liquid level meter according to another embodiment of the present application. In the other embodiment as shown in FIG. 4, the measurement units 2 may include a second excitation pulse circuit module 206, a second amplifying module 207 and a second sensor 208.

The second excitation pulse circuit module 206 may be connected with the waveguide wires 3.

The second amplifying module 207 may be connected with the second sensor 208. The second sensor 208 may be arranged to the head end of the waveguide wires and used to detect the torsional wave pulse signals transmitted to the head end of the waveguide wires 3.

As shown in FIG. 4, the control unit 6 may also include a third processor 603, transmit gating switches 604 and receive gating switches 605.

The third processor 603 may be connected with the transmit gating switches 604 and the receive gating switches 605 respectively. The transmit gating switches 604 may be connected with the second excitation pulse circuit modules 206 of each measurement unit 2 respectively. The receive gating switches 605 may be connected with the second amplifying modules 207 of each measurement unit 2 respectively.

Some embodiments will be described in more detail with reference to some specific applications.

In some specific applications, the third processor 603 of the control unit 6 transmits a control signal to the second excitation pulse circuit module 206 of a selected measurement unit 2 by transmit gating switches 604, to generate a excitation pulse signal. The excitation pulse signal is applied to the head end of the waveguide wires 3, and is transmitted along the waveguide wires 3 to generate the magnetic field around the waveguide wires 3.

The pulsed magnetic field generated by the waveguide wires 3 located at the position of the magnetic float 4 and the magnetic field generated by the magnetic float 4 interact, and thus the waveguide wires 3 will occur the magnetistriction effect. At the position of the magnetic float 4, the waveguide wires 3 will generate torsional wave pulse signals. The torsional wave pulse signals are transmitted towards two ends of the waveguide wires 3. The torsional wave pulse signals transmitted towards the head end of the waveguide wires 3 are detected by the second sensor 208. The second amplifying module 207 receives and amplifies the torsional wave pulse signals. By the receive gating switches, the second amplifying module 207 transmits the amplified signals to the third processor 603 of the control unit 6. The control unit 6 is used to determine the liquid level in that the magnetic float 4 is located.

In some specific application, the sensor as mentioned above can be an induction coil or a piezoelectric ceramics which can detect the torsional wave pulse signal.

In some specific applications, the transmit gating switches 604 and the receive gating switches 605 can be selected the existed gating switches, and have several gating channels. Each gating channel may correspond to one measurement unit.

Figure 5:
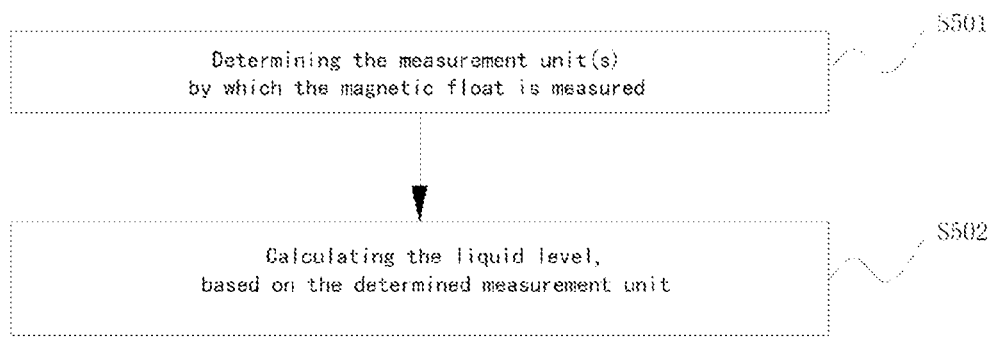
FIG. 5 is a flow chart of a liquid level measurement method according to one embodiment of the present application.

FIG. 5 is a flow chart of a liquid level measurement method according to one embodiment of the present application. The method can use any one of the magnetostrictive liquid level meters as mentioned above. As shown in FIG. 5, the liquid level measurement method may include the following steps.

In step S501, the measurement unit corresponding to the detection of the magnetic float is determined.

In the step S502, the liquid level is calculated based on the determined measurement unit.

In the embodiment of the method, the magnetostrictive liquid level meters related to the present application may be used. When the measurement unit obtaining the detection signal of the magnetic float is determined, the liquid level in that the magnetic float is located can be determined, based on the determined distance between the magnetic float 4 and the measuring unit 2 obtaining the detection signal and based on the fixed position relationship of each measurement unit. The method can raise the measurement range and assure the measurement accuracy. In the practical applications, the total measurement range of the magnetostrictive liquid level meter can be increase indefinitely, and the measurement accuracy can also be assured.

In one embodiment, the calculation of the liquid level may include a distance calculation and a liquid level determination.

In the distance calculation, the distance between the magnetic float and the predetermined measurement reference point can be calculated by a predetermined equation, based on the determined measurement unit.

In the liquid level determination, the liquid level can be obtained based on the calculated distance.

In one embodiment, the predetermined calculation equation may be as follows.

$$D = \left(L_n + \sum_{i=1}^{n} d_{i-1}\right) * Q_n + \left(L_{n-1} + \sum_{j=1}^{n-1} d_{j-1}\right) * Q_{n-1}$$

Where $Q_n + Q_{n-1} = 100\%$, D is the distance between the predetermined measurement reference point and the magnetic float, $L_n$ is a distance between the n measurement unit by which the magnetic float is measured and the magnetic float, $L_{n-1}$ is a distance between the n-1 measurement unit by which the magnetic float is measured and the magnetic float. i, j and n are integers, and $1 \leq i \leq n$, $1 \leq j \leq n-1$.

When i=1, $d_0$ is the distance between the first measurement unit and the predetermined measurement reference point. When $i \geq 1$, $d_{i-1}$ is the distance between the i-1 measurement unit and the i measurement unit.

When j=1 $d_0$ is the distance between the first measurement unit and the predetermined measurement reference point. When $j \geq 1$, $d_{j-1}$ is the distance between the j-1 measurement unit and the j measurement unit.

Both $Q_n$ and $Q_{n-1}$ are weights.

In the embodiment, by introducing the weight variables $Q_n$ and $Q_{n-1}$, the measurement result of one measurement unit will not be jumped to the measurement result of the other measurement unit. Especially even if the measurement results of the overlapping measurement region jump, the measurement results of the magnetostrictive liquid level meter will also be stable and continuous, and thus the measurement is more accurate.

Furthermore, If the determined measurement unit is only the n measurement unit, then $Q_n = 100\%$ and $Q_{n-1} = 0$.

The predetermined calculation equation can be simplified as $D = L_n + \sum_{i=1}^{n} d_{i-1}$.

Furthermore, if the determined measurement units are the n measurement unit and the n-1 measurement unit, the method may further include: obtaining the values of $Q_n$ and $Q_{n-1}$ according to the position of the magnetic float located in the overlapping measurement region.

In this embodiment, according the position at which the magnetic float is located in the overlapping measurement region, the values of $Q_n$ and $Q_{n-1}$ are calculated. The values of $Q_n$ and $Q_{n-1}$ will change dynamically according to the position change of magnetic float in the overlapping measurement region. By this way, the measurement of one measurement unit will smoothly transit to the measurement of the other measurement unit.

Figure 6:
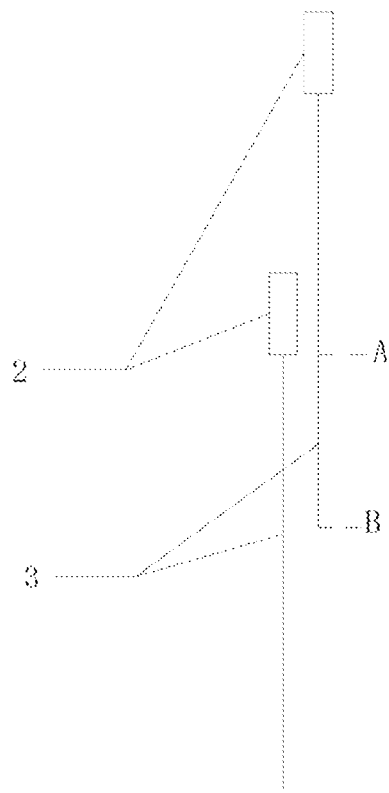
FIG. 6 is a schematic diagram of the overlapping measurement region between two adjacent measurement units according to one embodiment of the present application.
Figure 7:
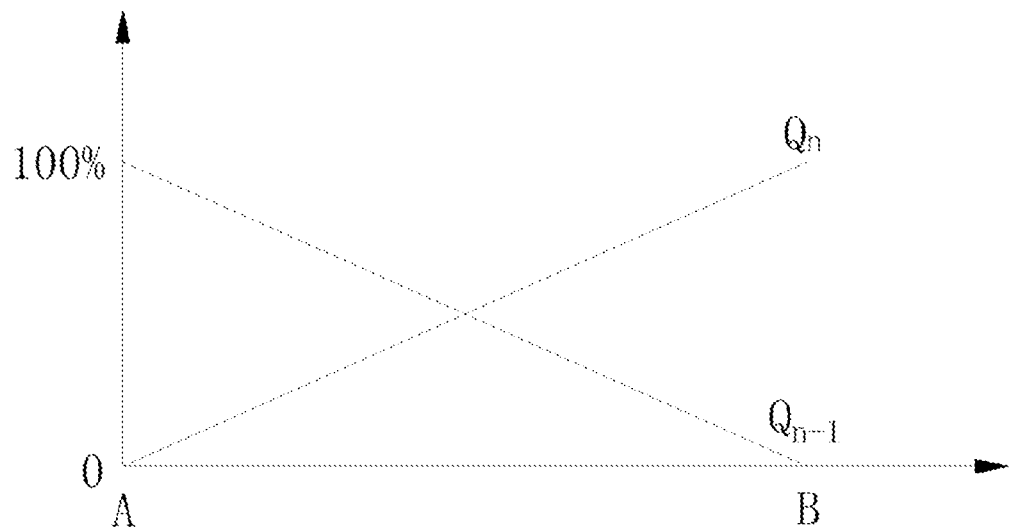
FIG. 7 is a schematic diagram of change of $Q_n$ and $Q_{n-1}$ the overlapping measurement region according to one embodiment of the present application.

FIG. 6 is a schematic diagram of the overlapping measurement region between two adjacent measurement units according to one embodiment of the present application. FIG. 7 is a schematic diagram of change of $Q_n$ and $Q_{n-1}$ in the overlapping measurement region according to one embodiment of the present application.

As shown in FIGS. 6 and 7, the values of $Q_n$ and $Q_{n-1}$ can be obtained, based on the position of the magnetic float in the overlapping measurement region.

Based on the overlapping measurement region, the value of $Q_n$ can be calculated using a predetermined first linear equation, and the value of $Q_{n-1}$ of can be calculated using a predetermined second linear equation, where $Q_n + Q_{n-1} = 100\%$. The slope of the first linear equation is a positive value, and the slope of the second linear equation is a negative value.

As shown in FIGS. 6 and 7, AB refers the overlapping measurement region between the two adjacent measurement units. In the direction from A to B, the value of $Q_n$ is increased incrementally from 0% to 100%. Accordingly, the value of $Q_{n-1}$ is decreased incrementally from 100% to 0%. In the overlapping measurement region, the weight of one measurement result is increased, the weight of the other measurement result is decreased, and the sum of the values of $Q_n$ and $Q_{n-1}$ keeps 100%. Therefore, in the overlapping measurement region, the smooth transition of the measurement results of the two adjacent measurement units can be assured.

Some embodiments will be described in detail with reference to some specific applications.

In one specific application, the magnetostrictive liquid level meter includes a first measurement unit and a second measurement unit, and is placed vertically to measure the liquid level. The first measurement unit is placed at the upper side, the second measurement unit is placed at the lower side, and the position relationship of both the first and second measurement units is shown in FIG. 6.

Assuming only the waveguide wire connected to the second measurement unit is located in the magnetic field formed by the magnetic float, the second measurement unit is determined as the measurement unit that measures the magnetic float. Based on the simplified calculation equation $D=L_n+\Sigma_{i=1}^{n}d_{i-1}$, the distance D between the magnetic float and the measurement reference point is $D=L_2+d_0+d_1$. Where $L_2$ is the distance of the magnetic float measured by the second measurement unit, $d_0$ is the distance between the first measurement unit and the predetermined measurement reference point, and $d_1$ is the distance between the first measurement unit and the second measurement unit.

In the practical application, the position of the first measurement unit may be determined as the predetermined measurement reference point, and thus $d_0=0$ and the calculation and measurement become easy.

With the rise of the liquid level, both the first measurement unit and the second measurement unit are located in the magnetic field formed by the magnetic float. In this situation, $D=(L_2+d_0+d_1)*Q_2+(L_1+d_0)*Q_1$.

Where $L_1$ is the distance of the magnetic float measured by the first measurement unit, $L_2$ is the distance of the magnetic float measured by the second measurement unit, $d_0$ is the distance between the first measurement unit and the predetermined measurement reference point, and $d_1$ is the distance between the first measurement unit and the second measurement unit. Furthermore, the values of $Q_n$ and $Q_{n-1}$ can be obtained from the corresponding linear equations.

In one specific application, the first measurement unit is set as the predetermined measurement reference point, and the several measurement units are distributed at equal interval. Therefore, the distance between two adjacent measurement units is determined, and the calculation of the predetermined calculation equation can be made more simple and convenient. In addition, the measurement lengths formed by each waveguide wire are equal, and thus only one change trend equation is utilized and the optimization of the calculation can be realized.

In the case that the first measurement unit is set as the predetermined measurement reference point, the several measurement units are distributed at equal interval, and the measurement lengths of each waveguide wire are equal, the predetermined calculation equation can be optimized as $$D=(L_n+(n-1)d)*Q_n+(L_{n-1}+(n-2)d)*Q_{n-1}.$$

It is to be understood that the same or similar parts in each of the above embodiments may be referred to each other, and those not described in detail in some embodiments may refer to the same or similar content in other embodiments.

It should be noted that in the description of the present application, the terms "first", "second" and the like are used for descriptive purposes only and are not to be construed as indicating or implying relative importance. Further, in the description of the present application, the meaning of "a plurality of" means at least two unless otherwise stated.

Any process or method description in the flowcharts or otherwise described herein may be understood as a module, segment or portion of code representing executable instructions including one or more steps for implementing a particular logical function or process. The scope of the preferred embodiments of the present disclosure includes additional implementations, in which the functions may be performed not in the order shown or discussed, including in a substantially simultaneous manner or in the reverse order depending on the functions involved, which should be understood by those skilled in the art to which the embodiments of the present application pertain.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A magnetostrictive liquid level meter, comprising:
a holder;
several measurement units configured to be fixed sequentially to the holder along a lengthwise direction of the holder;
several waveguide wires configured to be connected with the several measurement units in a one-to-one correspondence mode, wherein each waveguide wire is arranged along the lengthwise direction of the holder, and a tail end of a upper waveguide wire of the several waveguide wires is at least extended to a head end of a lower waveguide wire of the several waveguide wires; and a magnetic float configured to be sheathed outside the holder, wherein the magnetic float moves up and down along the holder when a liquid level is changed, and one or more waveguide wires are located in a magnetic field formed by the magnetic float;

wherein the measurement units and the waveguide wires are placed inside of the holder, the measurement units apply excitation pulse signals to the waveguide wires and detect torsional wave pulse signals generated in the waveguide wires, the total measurement range of the magnetostrictive liquid level meter is divided into several small measure ranges, and each measurement unit only performs a measurement of the small measurement range thereof.

2. The magnetostrictive liquid level meter of claim 1, wherein the tail end of the upper waveguide wire is extended to exceed the head end of the lower waveguide wire, but not exceed a tail end of the lower waveguide wire, and an overlapping measurement region is formed between two adjacent measurement units.

3. The magnetostrictive liquid level meter of claim 1, wherein the several measurement units are distributed at an equal interval, and/or measurement lengths of the waveguide wires are equal.

4. The magnetostrictive liquid level meter of claim 1, wherein the magnetostrictive liquid level meter also comprises a control unit, wherein the control unit is connected with the several measurement units respectively, receives data from one or more measurement units by which the magnetic float is measured, and calculates the liquid level based on the received data.

5. A liquid level measurement method using the magnetostrictive liquid level meter of claim 1, comprising:
   determining one or more measurement units by which the magnetic float is measured; and
   calculating the liquid level based on the determined one or more measurement units.

6. The method of claim 5, wherein calculating the liquid level comprises a distance calculation and a liquid level calculation,
   in the distance calculation, a distance between the magnetic float and a predetermined measurement reference point is calculated by a predetermined equation, based on the determined one or more measurement units; and
   in the liquid level calculation, the liquid level is calculated based on the calculated distance.

7. The method of claim 6, wherein the predetermined calculation equation is $$D = \left(L_n + \sum_{i=1}^{n} d_{i-1}\right) * Q_n + \left(L_{n-1} + \sum_{j=1}^{n-1} d_{j-1}\right) * Q_{n-1}$$

where $Q_n + Q_{n-1} = 100\%$, D is the distance between the predetermined measurement reference point and the magnetic float, $L_n$ is a distance between a n measurement unit by which the magnetic float is measured and the magnetic float, $L_{n-1}$ is a distance between a n-1 measurement unit by which the magnetic float is measured and the magnetic float, i, j and n are integers, and $1 \leq i \leq n$, $1 \leq j \leq n-1$, when i=1, $d_0$ is a distance between a first measurement unit and the predetermined measurement reference point, and when $i \geq 1$, $d_{i-1}$ is a distance between a i-1 measurement unit and a i measurement unit, when j=1 $d_0$ is the distance between the first measurement unit and the predetermined measurement reference point, and when $j \geq 1$, $d_{j-1}$ is a distance between a j-1 measurement unit and a j measurement unit, and both $Q_n$ and $Q_{n-1}$ are weights.

8. The method of claim 7, wherein the determined measurement unit is only the n measurement unit, $Q_n = 100\%$ and $Q_{n-1} = 0$, and the predetermined calculation equation is simplified as $D = L_n + \sum_{i=1}^{n} d_{i-1}$.

9. The method of claim 7, wherein the determined measurement units are the n measurement unit and the n-1 measurement unit, and the method further comprises:
   calculating values of $Q_n$ and $Q_{n-1}$, based on a position of the magnetic float in the overlapping measurement region.

10. The method of claim 9, wherein based on the overlapping measurement region, the value of $Q_n$ is calculated using a predetermined first linear equation, the value of $Q_{n-1}$ is calculated using a predetermined second linear equation, and $Q_n + Q_{n-1} = 100\%$, and wherein a slope of the predetermined first linear equation is a positive value and a slope of the predetermined second linear equation is a negative value.

11. The magnetostrictive liquid level meter of claim 2, wherein the magnetostrictive liquid level meter also comprises a control unit, wherein the control unit is connected with the several measurement units respectively, receives data from one or more measurement units by which the magnetic float is measured, and calculates the liquid level based on the received data.

12. The magnetostrictive liquid level meter of claim 3, wherein the magnetostrictive liquid level meter also comprises a control unit, wherein the control unit is connected with the several measurement units respectively, receives data from one or more measurement units by which the magnetic float is measured, and calculates the liquid level based on the received data.

13. A liquid level measurement method using the magnetostrictive liquid level meter of claim 2, comprising:
   determining one or more measurement units by which the magnetic float is measured; and
   calculating the liquid level based on the determined one or more measurement units.

14. A liquid level measurement method using the magnetostrictive liquid level meter of claim 3, comprising:
   determining one or more measurement units by which the magnetic float is measured; and
   calculating the liquid level based on the determined one or more measurement units.

15. A liquid level measurement method using the magnetostrictive liquid level meter of claim 4, comprising:
   determining one or more measurement units by which the magnetic float is measured; and calculating the liquid level based on the determined one or more measurement units.

* * * * *